United States Patent
Rui et al.

(10) Patent No.: US 7,035,764 B2
(45) Date of Patent: *Apr. 25, 2006

(54) SYSTEM AND PROCESS FOR TRACKING AN OBJECT STATE USING A PARTICLE FILTER SENSOR FUSION TECHNIQUE

(75) Inventors: Yong Rui, Sammamish, WA (US); Yunqiang Chen, Plainsboro, NJ (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 10/985,243

(22) Filed: Nov. 10, 2004

(65) Prior Publication Data
US 2005/0114079 A1    May 26, 2005

Related U.S. Application Data

(63) Continuation of application No. 10/428,470, filed on May 2, 2003, now Pat. No. 6,882,959.

(51) Int. Cl.
*G06F 17/18* (2006.01)
*G06F 15/18* (2006.01)
*G06F 9/445* (2006.01)

(52) U.S. Cl. .................. 702/179; 342/64; 345/473; 382/103; 706/16; 706/52

(58) Field of Classification Search .......... 702/150, 702/179–182, 186–188; 706/15, 16, 20, 706/23–25, 51, 52; 342/64; 345/473; 382/103
See application file for complete search history.

(56) References Cited

U.S. PATENT DOCUMENTS

| | | | | |
|---|---|---|---|---|
| 5,341,142 A | * | 8/1994 | Reis et al. ................ 342/64 |
| 6,115,052 A | * | 9/2000 | Freeman et al. ......... 345/473 |
| 6,499,025 B1 | * | 12/2002 | Horvitz et al. ............ 706/52 |
| 6,502,082 B1 | * | 12/2002 | Toyama et al. ........... 706/16 |
| 6,882,959 B1 | * | 4/2005 | Rui et al. ................ 702/179 |

* cited by examiner

*Primary Examiner*—John Barlow
*Assistant Examiner*—John Le
(74) *Attorney, Agent, or Firm*—Lyon & Harr, LLP; Richard T. Lyon

(57) ABSTRACT

A system and process for tracking an object state over time using particle filter sensor fusion and a plurality of logical sensor modules is presented. This new fusion framework combines both the bottom-up and top-down approaches to sensor fusion to probabilistically fuse multiple sensing modalities. At the lower level, individual vision and audio trackers can be designed to generate effective proposals for the fuser. At the higher level, the fuser performs reliable tracking by verifying hypotheses over multiple likelihood models from multiple cues. Different from the traditional fusion algorithms, the present framework is a closed-loop system where the fuser and trackers coordinate their tracking information. Furthermore, to handle non-stationary situations, the present framework evaluates the performance of the individual trackers and dynamically updates their object states. A real-time speaker tracking system based on the proposed framework is feasible by fusing object contour, color and sound source location.

7 Claims, 7 Drawing Sheets

SYSTEM AND PROCESS FOR TRACKING AN OBJECT STATE USING A PARTICLE FILTER SENSOR FUSION TECHNIQUE

CROSS-REFERENCE TO RELATED APPLICATIONS

This application is a continuation of a prior application entitled "A SYSTEM AND PROCESS FOR TRACKING AN OBJECT STATE USING A PARTICLE FILTER SENSOR FUSION TECHNIQUE" which was assigned Ser. No. 10/428,470 and filed May 2, 2003 now U.S. Pat. No. 6,882,959.

BACKGROUND

1. Technical Field

The invention is related to systems and processes for tracking an object state over time using sensor fusion techniques, and more particularly to such a system and process having a two-level, closed-loop, particle filter sensor fusion architecture.

2. Background Art

Sensor fusion for object tracking has become an active research topic during the past few years. But how to do it in a robust and principled way is still an open problem. The problem is of particular interest in the context of tracking the location of a speaker. Distributed meetings and lectures have been gaining in popularity [4, 14]. A key technology component in these systems is a reliable speaker tracking module. For instance, if the system knows the speaker location, it can dynamically point a camera so that the speaker stays within the view of a remote audience. There are commercial video conferencing systems that provide speaker tracking based on audio sound source localization (SSL). While tracking the speaker using SSL can provide a much richer experience to remote audiences than using a static camera, there is significant room for improvement. Essentially, SSL techniques are good at detecting a speaker, but do not perform well for tracking, especially when the person of interest is not constantly talking.

A more reliable speaker tracking technique involves the fusion of high-performance audio-based SSL with vision-based tracking techniques to establish and track the location of a speaker. This type of sensor fusion is reported in [2] and [13]. It is noted that the term "sensor" is used herein in a generalized way. It represents a logical sensor instead of a physical sensor. For example, both vision-based contour and color tracking techniques would be considered logical sensors for the purposes of the present tracking system and process, but are based on the same physical sensor—i.e., a video camera. In addition, sensors can perform different tasks depending on the complexity of the sensor algorithms. For example, some sensors perform tracking and are called trackers, while others merely perform verification (e.g., computing a state likelihood) and are called verifiers.

In general, there are two existing paradigms for sensor fusion: bottom-up and top-down. Both paradigms have a fuser and multiple sensors. The bottom-up paradigm starts from the sensors. Each sensor has a tracker and it tries to solve an inverse problem—namely estimating the unknown state based on the sensory data. To make the inverse problem tractable, assumptions are typically made in the trackers. For example, system linearity and Gaussianality are assumed in conventional Kalman-type trackers. These assumptions significantly reduce the problem complexity and the trackers can run in real time. Once the individual tracking results are available, relatively simple distributed sensor networks [1] or graphical models [15] are used to perform the sensor fusion task. While the assumptions make the problem tractable, they inherently hinder the robustness of the bottom-up techniques.

The top-down paradigm, on the other hand, emphasizes the top. Namely, it uses intelligent fusers but simple sensors (e.g., verifiers) [17, 9]. This paradigm solves the forward problem, i.e., evaluating a given hypothesis using the sensory data. First, the fuser generates a set of hypotheses (also called particles) to cover the possible state space. All the hypotheses are then sent down to the verifiers. The verifiers compute the likelihood of the hypotheses and report back to the fuser. The fuser then uses weighted hypotheses to estimate the distribution of the object state. Note that it is usually much easier to verify a given hypothesis than to solve the inverse tracking problem (as in the bottom-up paradigm). Therefore, more complex object models (e.g., non-linear and non-Gaussian models) can be used in the top-down paradigm. This in turn results in more robust tracking. There is, however, inefficiency with this paradigm. For example, because the sensors have verifiers instead of trackers, they do not help the fuser to generate good hypotheses. The hypotheses are semi-blindly generated [17], and some can represent low-likelihood regions—thus lowering efficiency [10]. Further, in order to cover the state space sufficiently well, a large number of hypotheses are needed, and this requires extensive computing power.

Thus, the bottom-up paradigm can provide fast tracking results, but at the expense of simplified assumptions. On the other hand, the top-down paradigm does not require simplified assumptions but needs extensive computation because the hypotheses can be very poor. Furthermore, a common drawback with both paradigms is that they are open-loop systems. For example, in the bottom-up paradigm, the fuser does not go back to the tracker to verify how reliable the tracking results are. Similarly, in the top-down paradigm, the sensors do not provide cues to the fuser to help generate more effective hypotheses. The present speaker tracking system and process provides a novel sensor fusion framework that utilizes the strength of both paradigms while avoiding their limitations.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for tracking an object state over time using a particle filter sensor fusion technique and a plurality of logical sensor modules. This new fusion framework integrates the two aforementioned paradigms to achieve robust real-time tracking. It retains both the speed of the bottom-up paradigm and the robustness of the top-down paradigm.

In general, this tracking system and process involves first employing a plurality of the aforementioned logical sensors to estimate the state of an object of interest. For example, in a case where the tracking system is used to track a speaker, the object state could be the location of that speaker. In such a tracking system, one of the logical sensors could be a vision-based object contour sensor that tracks the location of human heads within an image of a scene where the speaker is present using head shape as the cue. Another logical sensor that could be used is a vision-based color sensor which can track the location of human heads within an image using head color as a visual cue. Notice that these two vision-based sensors are complementary in that they can use the same image of the scene and both locate human heads within the scene, albeit by different methods. Yet another logical sensor that can be employed is an audio-based sound source location sensor that tracks the location of a source of human speech using a microphone array. Here again this sensor would be complementary in the sense that the source of the speech will be the speaker's head. While the logical sensors employed need not be complimentary, this can be advantageous as it adds to the robustness of the tracking results. It is noted that the present invention is not intended to be limited to just those conventional logical sensors described above or to just a speaker locating system. Rather the present invention can be advantageously employed in any tracking scheme and the logical sensor can be any type typically used for the desired application.

Once the logical sensors have estimated the object states, they are input into a fuser module, which then combines the estimates to form a proposal function. In one version of the present system and process, these object state estimates are in the form of Gaussian distributions. This allows the tracking function of the sensors to employ simplifying assumptions such as Gaussianality and linearity so as to reduce the processing cost and increase the speed at which the estimates can be generated. While accuracy is sacrificed somewhat at this point in the process due to these assumptions, it is not an issue as will be explained shortly. The action of combining the object state estimate distributions to form the proposal distribution can also involve weighting the estimate distributions using reliability factors associated with each of the logical sensors providing the distributions. In one version of the present system and process, the reliability factors are computed dynamically by re-computing them during each tracking iteration. Essentially, the reliability factor quantifies the degree of similarity between the object state estimate distribution computed by a logical sensor and the final distribution computed for that iteration (as will be described later). The fuser module uses the last computed reliability factor associated with each logical sensor in the next iteration to weight the estimate distribution generated by that sensor as part of combining the object state estimate distributions.

The combined estimate distributions represent a proposal distribution that can be used as a basis for a particle filter approach. To this end, the proposal distribution is sampled to produce a series of particles. These particles are then provided to each of the logical sensors for verification. Thus, the present system and process is a two-level, closed loop scheme in that information flows back and forth from the fuser module and the logical sensors to produce highly accurate object state estimates.

The verification procedure involves each logical sensor estimating the likelihood of each particle provided by the fuser module. Thus, each logical sensor has two parts-namely an object state tracker for generating the object state estimates and an object state verifier for verifying the particles generated by the fuser module. This architecture has a significant advantage as the likelihood models used by the tracker and verifier can differ. It is desired that the tracker provide quick and computationally inexpensive estimates.

Thus the likelihood model employed by a tracker will necessarily be somewhat loose. However, it is desired that the verifier be quite accurate so that any error introduced in the original object state estimate is compensated for by identifying inaccurate particles generated as a result of the original estimates. To this end, the likelihood model employed by the verifier should be more precise and discriminating than that used by the tracker. This is possible since the verifier only needs to verify a given hypothesis, which is much easier than solving the tracking problem and so requires less computational power and time.

Once the likelihood estimates are generated for each particle by each of the logical sensors and provided to the fuser module, the fuser computes a combined likelihood model for the particle. The fuser then uses this combined likelihood model, along with the proposal distribution, an object dynamics model which models the changes in the object state over time for the particular application involved, and the weight associated with a corresponding particle in the last tracking iteration (which in the case of the first iteration is a prescribed initiating weight) to compute the weight in the current iteration. The particles and particle weights are then used by the fuser module to compute a final estimate of the object state for the current tracking iteration. In one version of the present system and process, this final object state estimate takes the form of a distribution.

The foregoing procedures are repeated for every iteration of the tracking process in order to track the state of the desired object. However, one more feature can also be implemented to improve the accuracy of each subsequent iteration especially in non-stationary situations. This feature involves dynamically adapting the object state tracker of each logical sensor module during each tracking iteration by providing each tracker with a revised object state estimate. This revised estimate is used by the object state tracker in the next tracking iteration to compute an updated object state, in lieu of using the object state computed by the tracker in the current tracking iteration. In one version of the present system and process, the revised object state estimate provided to a tracker is computed by employing the aforementioned reliability factor associated with the logical sensor containing the tracker. It is noted that the reliability factor ranges between 0 and 1. Given this, the revised object state estimate can be computed as the sum of the object state estimate distribution computed by the tracker multiplied by the reliability factor and the final distribution multiplied by 1 minus the reliability factor. In this way if an individual tracker is reliable, the revised estimate for that tracker depends more on its own estimate; otherwise, it depends more on the fuser's estimate. Thus, a more accurate estimate is used by the tracker as a starting point for generating the object state estimate in the next iteration of the tracking process.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
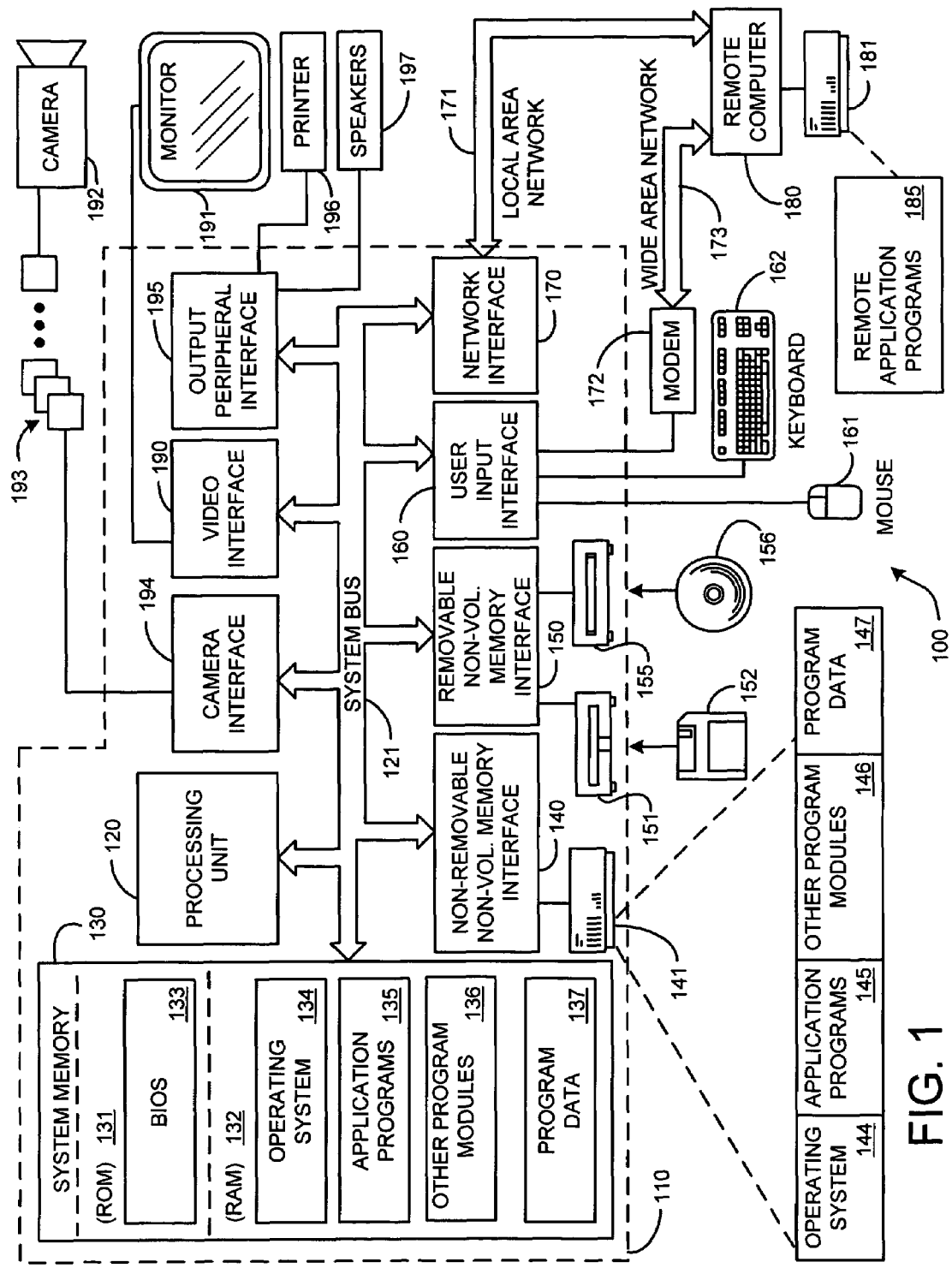
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone or microphone array, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the program modules embodying the invention.

2.0 Generic Particle Filtering

In order to better understand the sensor fusion framework of the present invention that will be described in subsequent sections, a thorough knowledge of the general particle filtering technique is helpful. This section will be dedicated to providing this knowledge. In CONDENSATION [6], extended factored sampling is used to explain how the particle filter works. Even though easy to follow, it obscures the role of the proposal distributions. In this section, an alternative formulation of the particle filtering theory that is centered on these proposal distributions is presented. Proposal distributions can be used to both improve particle filter's performance and to provide a principled way of accomplishing sensor fusion.

Let $X_{0:t}$ represent the object states of interest (e.g., object position and size) and $Z_{0:t}$ represent the observation (e.g., audio signal or video frame) from time 0 to t.

A non-parametric way to represent a distribution is to use particles drawn from the distribution. For example, the following point-mass approximation can be used to represent the posterior distribution of X:

$$\hat{p}(X_{0:t} | Z_{1:t}) = \frac{1}{N} \sum_{i=1}^{N} \delta_{X_{0:t}^{(i)}}(dX_{0:t}) \qquad (1)$$

where $\delta$ is the Dirac delta function, and particles $X_{0:t}^{(i)}$ are drawn from $p(X_{0:t}|Z_{1:t})$. The approximation converges in distribution when N is sufficiently large [5,10]. This particle-based distribution estimation is, however, only of theoretical significance. In reality, it is the posterior distribution that needs to be estimated, and thus is not known. Fortunately, the particles can instead be sampled from a known proposal distribution $q(X_{0:t}|Z_{1:t})$ and $p(X_{0:t}|Z_{1:t})$ can still be computed.

Definition 1 [8]: A set of random samples $\{X_{0:t}^{(i)}, w_{0:t}^{(i)}\}$ drawn from a distribution $q(X_{0:t}|Z_{1:t})$ is said to be properly weighted with respect to $p(X_{0:t}|Z_{1:t})$ if for any integrable function $g(\ )$ the following is true:

$$E_p(g(X_{0:t})) = \lim_{N \to \infty} \sum_{i=1}^{N} g(X_{0:t}^{(i)}) w_{0:t}^{(i)} \tag{2}$$

Furthermore, as N tends toward infinity, the posterior distribution P can be approximated by the properly weighted particles drawn from q [8,10]:

$$\hat{p}(X_{0:t}|Z_{1:t}) = \sum_{i=1}^{N} w_{0:t}^{(i)} \cdot \delta_{X_{0:t}^{(i)}}(dX_{0:t}) \tag{3}$$

$$\tilde{w}_{0:t}^{(i)} = \frac{p(Z_{1:t}|X_{0:t}^{(i)}) p(X_{0:t}^{(i)})}{q(X_{0:t}^{(i)}|Z_{1:t})} \tag{4}$$

$$w_{0:t}^{(i)} = \frac{\tilde{w}_{0:t}^{(i)}}{\sum_{i=1}^{N} \tilde{w}_{0:t}^{(i)}} \tag{5}$$

where $\tilde{w}_{0:t}^{(i)}$ and $w_{0:t}^{(i)}$ are the un-normalized and normalized particle weights, respectively.

In order to propagate the particles $\{X_{0:t}^{(i)}, w_{0:t}^{(i)}\}$ through time, it is beneficial to develop a recursive calculation of the weights. This can be obtained straightforwardly by considering the following two facts:

1) Current states do not depend on future observations. That is, $q(X_{0:t}|Z_{1:t}) = q(X_{0:t-1}|Z_{1:t-1}) q(X_t|X_{0:t-1}, Z_{1:t})$ 2) The system state is a Markov process and the observations are conditionally independent given the states [6,10], i.e.:

$$p(X_{0:t}) = p(X_0) \prod_{j=1}^{t} p(X_j|X_{j-1}) \tag{6}$$

$$p(Z_{1:t}|X_{0:t}) = \prod_{j=1}^{t} p(Z_j|X_j)$$

Substituting the above equations into Equation (4), a recursive estimate for the weights is obtained:

$$\tilde{w}_t^{(i)} = \frac{p(Z_{1:t}|X_{0:t}^{(i)}) p(X_{0:t}^{(i)})}{q(X_{0:t-1}^{(i)}|Z_{1:t-1}) q(X_t^{(i)}|X_{0:t-1}^{(i)}, Z_{1:t})} \tag{7}$$

$$= \tilde{w}_{t-1}^{(i)} \frac{p(Z_{1:t}|X_{0:t}^{(i)}) p(X_{0:t}^{(i)})}{q(X_{0:t-1}^{(i)}) p(Z_{1:t-1}|X_{0:t-1}^{(i)}) q(X_t^{(i)}|X_{0:t-1}^{(i)}, Z_{1:t})}$$

$$= \tilde{w}_{t-1}^{(i)} \frac{p(Z_t|X_t^{(i)}) p(X_t^{(i)}|X_{t-1}^{(i)})}{q(X_t^{(i)}|X_{0:t-1}^{(i)}, Z_{1:t})}$$

Note that the particles are now drawn from the proposal distribution $q(X_t|X_{0:t-1}, Z_{1:t})$ instead of from the posterior P. To summarize, the particle filtering process has three steps:

a) Sampling step: N particles $X_t^{(i)}$, $i=1, \ldots, N$ are sampled from the proposal function $q(X_t|X_{0:t-1}, Z_{1:t})$;
b) Measurement step: The particle weights are computed using Eq. (7); and
c) Output step: The weighted particles are used to compute the tracking results.

The foregoing proposal-centric view sheds new lights on the role of the proposal distribution in the particle filtering process. First, the proposal distribution is used to generate particles. Second, the proposal distribution is used to calculate particle weights (Eq. (7)). In practice, there are an infinite number of choices for the proposal distribution, as long as its supports the posterior distribution. But the quality of the proposals can differ significantly. For example, poor proposals (far different from the true posterior) will generate particles that have negligible weights, and so create inefficiency. On the other hand, particles generated from good proposals (i.e., those similar to the true posterior) are highly effective. Choosing the right proposal distribution is therefore of great importance. Indeed, the proposal is not only at the center of the particle filtering process, but also provides a principled way to perform sensor fusion.

3.0 Sensor Fusion

Good proposals generate effective particles. This is especially important when multiple sensors are processed and the problem state space has high dimensionality. In the context of tracking, various approaches have been proposed to obtain more effective proposals than the transition prior (i.e. $p(X_t|X_{t-1})$) [6]. If there is only a single sensor, an auxiliary Kalman-filter tracker can be used to generate the proposal [12]. When multiple sensors are available, a master-slave approach is proposed in [7], where a slave tracker (e.g., a color-blob tracker) is used to generate proposals for the master trackers (e.g., a particle-based contour tracker). While this approach achieves better results than the single sensor approaches, its master-slave structure breaks the symmetry between trackers. Furthermore, because the slave tracker is not included in the overall observation likelihood model, complementary and important tracking information from the slave tracker could be discarded [7].

Figure 2:
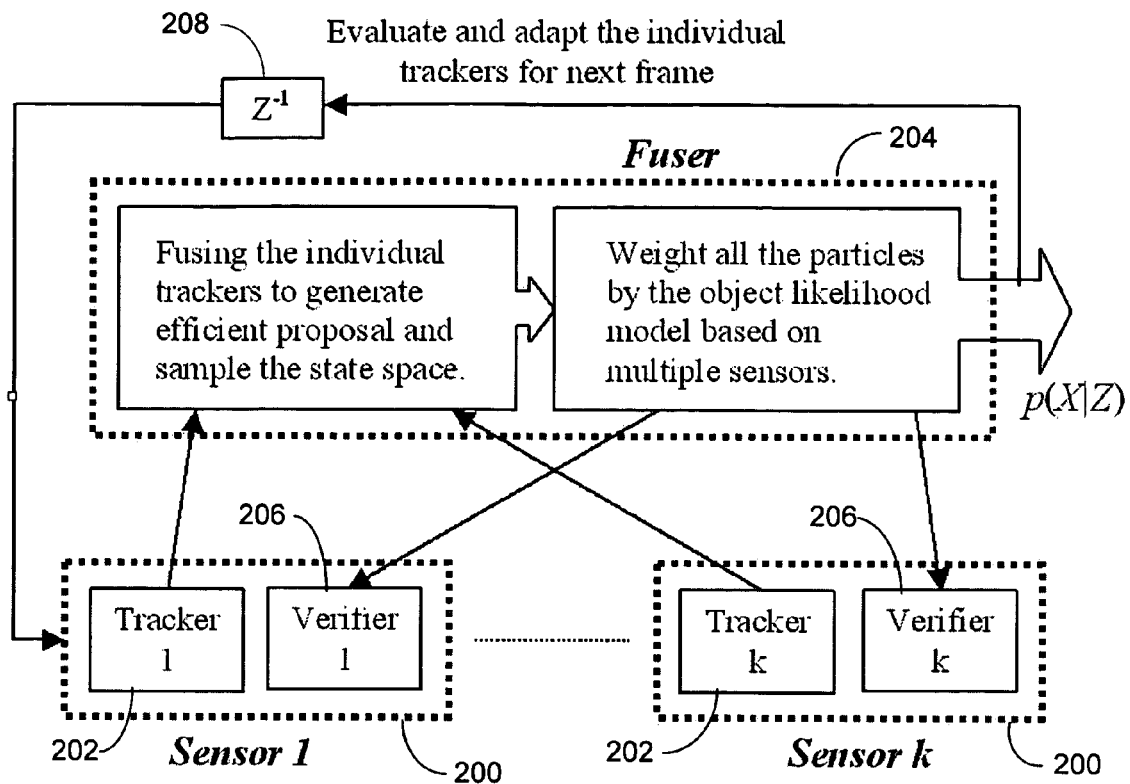
FIG. 2 is a block diagram showing a two-level, closed-loop, particle filter sensor fusion architecture in accordance with the present invention.
Figure 3:
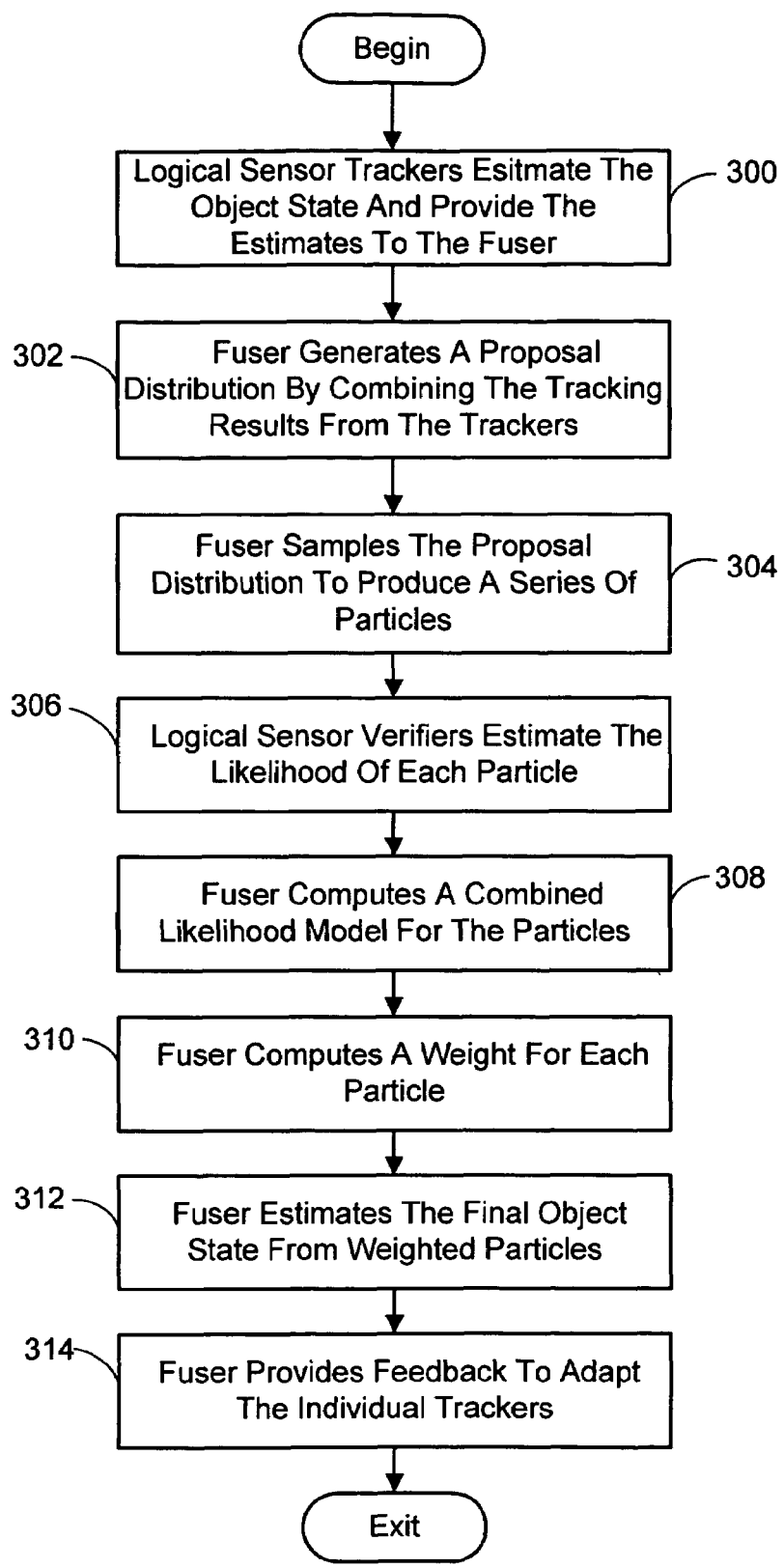
FIG. 3 is a flow chart diagramming a process for tracking an object state over time in accordance with the present invention using particle filter sensor fusion techniques and a plurality of logical sensor modules.

In the present speaker tracking system and process, a two-level, closed-loop particle filter architecture is employed for sensor fusion as depicted in FIG. 2, with the proposal distribution being the focal point. This approach integrates the benefits of both the previously-described bottom-up and top-down paradigms. For robustness, multiple, complementary sensory data sources 200, (i.e., logical sensors 1 through k) are utilized. At the lower level, individual trackers 202 perform independent tracking based on different cues and report tracking results up to the fuser 204 (see Section 4). At the upper level, the fuser 204 constructs an informed proposal by integrating tracking results from all the trackers. Particles are sampled from this proposal and sent down to verifiers 206 to compute their likelihoods (see Section 5), which are then fed back to the fuser 204 which combines them and computes weights for each particle. The set of evaluated particles constitutes a good estimate of the posterior [10]. The individual trackers can also be dynamically adapted by providing feedback 208 from the fuser 204. In general, the foregoing architecture is used as follows, referring to FIG. 3.

First, tracking is performed by the individual logical sensor trackers in the system and the resulting object state estimates are provided to the fuser (process action 300). These trackers use the appropriate assumptions (e.g., Gaussianality and linearity) resulting in fast, but perhaps less robust, tracking results denoted as $q_k(X_t^k|X_{0:t-1}^k, Z_{1:t}^k)$, where k is the index for individual trackers. Examples of three different trackers that could be used in the present speaker tracking system are described in Section 4. The fuser generates a proposal distribution by integrating the tracking results from the multiple trackers (process action 302). This proposal distribution represents a mixture of Gaussian distributions, i.e.,:

$$q(X_t | X_{0:t-1}, Z_{1:t}) = \sum_k \lambda_k \cdot q_k(X_t^k | X_{0:t-1}^k, Z_{1:t}^k)$$

where $\lambda_k$ is the reliability of tracker k and is estimated dynamically as will be described in Section 6. It is noted that since the final proposal is a mixture of all the individual proposals, the present tracking system is robust even when some of the trackers fail. In fact, as long as one of the individual proposals covers the true object state, particles will be generated in the neighborhood of the true state and will get a high likelihood score (as will be shown next), thus keeping effective track of the object.

Once the proposal distribution is generated, the fuser generates particles $X_t^{(i)}$, i=1, ..., N from the distribution (process action 304). The generated particles are sent down to the logical sensor verifiers to compute their likelihoods in process action 306, and then the likelihood estimates are sent back to the fuser. The fuser next computes a combined likelihood model for the particles from the likelihood estimates in process action 308. Assuming independence between the likelihoods from different verifiers, the overall likelihood is:

$$p(Z_t | X_t^{(i)}) = \prod_k p(Z_t^k | X_t^{(i)}) \qquad (8)$$

The fuser also computes a weight for each particle using Eq. 7 (process action 310). The set of weighted particles is then used to estimate of the final object state (process action 312). More particularly, in one version of the present tracking system and process, a conditional mean of $X_t$ is computed using Equation (2) with $g_t(X_t)=X_t$, and a conditional covariance of $X_t$ is computed using Equation (2) with $g_t(X_t)=X_tX_t^T$, to represent the object state. Alternate methods of designating the final object estimate are also possible. For example, the weighted particles could be used in a more simplified manner by designating the largest one of them as the object state.

Note that each sensor has both a tracker and a verifier. The tracker tries to solve the inverse problem efficiently. Small errors are therefore allowed and can be corrected later by the fuser and verifier. Simplifications (e.g., constant object color histogram or Gaussianality) are usually assumed in the tracker to ensure efficiency. The verifier, on the other hand, only needs to verify a given hypothesis, which is much easier than solving the inverse problem. More comprehensive and accurate likelihood models $p(Z_t|X_t)$ can therefore be exploited in the verifier (see Section 5). The separation of tracker and verifier functions strikes a good balance between efficiency and robustness.

To handle non-stationary situations and potential "mistracks", the individual trackers can be adapted by providing feedback from the fuser (process action 314). More particularly, object states (e.g., position and size) and attributes (e.g., color histogram) are updated dynamically based on the fuser's estimation of the posterior. The reliability of each tracker is also evaluated based on the performance of the corresponding proposal. More reliable trackers will contribute more to the proposal functions and unreliable trackers will be reinitialized. This aspect of the system will be discussed in Section 6.

The foregoing two-level, closed-loop sensor fusion framework is a general framework for combining different cues, individual trackers and high level object likelihood modeling together. It is more robust than the bottom-up paradigm because it uses multiple hypotheses and verifies based on more accurate object model. It is computationally more effective than the top-down paradigm because it starts with more accurate proposal distributions. It is also more reliable than both paradigms because it is a closed-loop system where object states and attributes are dynamically updated. In the following sections, this fusion framework is applied to an example of real-time speaker tracking.

4.0 Individual Trackers

Although the verification process can correct some tracking errors, it is desirable and effective if the trackers can provide accurate results in the first place. In this section, three trackers are described which are based on complementary cues. It should be noted that these are examples only. Other conventional tracker types could also be employed and are within the scope of the present invention.

According to the set theory, every closed set (e.g., an object) can be decomposed into two disjoint sets: the boundary and the interior. Since these two sets are complementary, we develop two vision-based trackers that use two complementary cues (contour and interior color) to track human heads. We also develop an audio-based SSL tracker which further complements the vision-based trackers.

In general, a human head is approximated in the present speaker tracking system and process as a vertical ellipse with a fixed aspect ratio of 1.2: $X_t=[x_t^c, y_t^c, \alpha_t]$, where $(x_t^c, y_t^c)$ is the center of the ellipse, and $\alpha_t$ is the major axis of the ellipse. A tracker estimates its belief of the object state $X_t^k$ based on its own observation $Z_t^k$. Note that it is not required for all the trackers to estimate all the elements in the state vector $X_t$. For example, the contour tracker estimates $[x_t^c, y_t^c, \alpha_t]$, while the SSL tracker only estimates $x_t^c$.

4.1. The Contour Tracker

For each frame, a hidden Markov model (HMM) is used to find the best contour s*. An unscented Kalman filter (UKF) [2] is then used to track object state $X_t$ over time.

Figure 4:
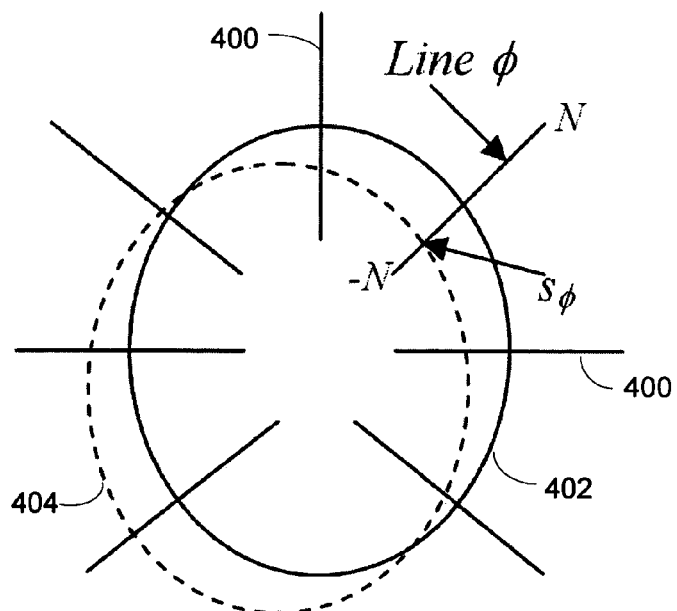
FIG. 4 is a diagram illustrating parametric contour tracking where the solid curve is the predicted contour, the dashed curve is the true contour and $s_\phi, \phi \in [1,M]$ is the true contour point on the $\phi^{th}$ normal line.

Note the notations used in this section. In HMM, s* is typically used to represent best states and in UKF $Y_t$ is typically used to represent measurements. These conventions are followed herein, but it is pointed out that in the context of the present invention, s* and $Y_t$ are the same entity which represents the best detected contour. The aforementioned Gaussian distributed proposal function associated with the contour tracker is generated as follows [2]:

a) Measurement collection: At time t, edge detection is conducted along the normal lines 400 of a predicted contour location, as shown in FIG. 4. $Z_t^1 = \{z_\phi, \phi \in [1,M]\}$ is used to denote the edge intensity observation, where the superscript "1" in $Z_t^1$ represents this is the first sensor (i.e., contour sensor). The solid curve 402 shown in FIG. 4 is the predicted contour, while the dashed curve 404 is the true contour it is desired to find. The term $s_\phi, \phi \in [1,M]$ represents the true contour point on the $\phi^{th}$ normal line. Each normal line has [−N, N]=2N+1 pixels. Because of background clutter, there can be multiple edges on each normal line.

b) Contour detection using an HMM: HMM usually is used in the temporal domain (e.g., speech recognition). Here it is used to model the contour smoothness constraint in the spatial domain. Specifically, the hidden states are the true contour position $s_\phi$ on each normal line. The goal is to estimate the hidden states based on observations. An HMM is specified by the likelihood model $p(z_\phi | s_\phi)$ and the transition probabilities $p(s_\phi | s_{\phi-1})$ which will be discussed next.

c) Likelihood model: With the assumption that background clutter is a Poisson process with density γ and the detection error is normally distributed as $N(0, \sigma_z)$, the likelihood that $s_\phi$ is a contour is given by [6]:

$$p(z_\phi | s_\phi) \propto 1 + \frac{1}{\sqrt{2\pi}\, \sigma_z q \gamma} \sum_{m=1}^{J_\phi} \exp\left(-\frac{(z_m - s_\phi)^2}{2\sigma_z^2}\right) \quad (9)$$

where $J_\phi$ is the number of detected edges on line $\phi$ and q is the prior probability of the contour not being detected.

d) Transition probabilities: The state transition probabilities encode the spatial dependencies of the contour points on neighboring normal lines. In FIG. 4, it can be seen that the true contour points on adjacent normal lines tend to have similar displacement from the predicted position (i.e., the center of each normal line). This is the contour smoothness constraint and can be captured by transition probabilities $p(s_\phi | s_{\phi-1})$, which penalizes sudden changes between neighboring contour points:

$$p(s_\phi | s_{\phi-1}) = c \cdot e^{-(s_\phi - s_{\phi-1})^2 / \sigma_s^2} \quad (10)$$

where c is a normalization constant and $\sigma_s$ is a predefined constant that regulates the contour smoothness.

e) Optimization: Given the observation sequence $Z_t^1 = \{z_\phi, \phi \in [1, M]\}$ and the transition probabilities $a_{i,j} = p(s_{\phi+1} = j | s_\phi = i)$, $i, j \in [−N, N]$, the best contour can be obtained by finding the most likely state sequence s* using the Viterbi algorithm [11]:

$$s^* = \underset{s}{\mathrm{argmax}}\, P(s | Z_t^1) = \underset{s}{\mathrm{argmax}}\, P(s, Z_t^1)$$

f) Tracking over time using UKF: UKF extends the regular Kalman filter to handle non-linear systems. Let the system be $X_t = f(X_{t-1}, d_t)$ and $Y_t = g(X_t, v_t)$, where $d_t$ and $v_t$ are zero-mean Gaussian noises. Additionally, let $X_{t|t-1} = E(f(X_{t-1}, d_t))$ and $Y_{t|t-1} = E(g(f(X_{t-1}, d_t), v_t))$. The system state $X_t$ can be estimated as:

$$\hat{X}_t^1 = X_{t|t-1} + K_t \cdot (Y_t - Y_{t|t-1})$$

where $Y_t = s^* = [s_1, \ldots s_\phi, \ldots, s_M]^T$ is the measurement and $K_t$ is the Kalman gain [2]. The Langevin process [16] is used to model the object dynamics:

$$X_t = f(X_{t-1}, d_t) = \begin{bmatrix} 1 & \tau \\ 0 & a \end{bmatrix} \begin{bmatrix} X_{t-1} \\ \dot{X}_{t-1} \end{bmatrix} + \begin{bmatrix} 0 \\ b \end{bmatrix} d_t \quad (11)$$

where $a = \exp(-\beta_\theta \tau)$, $b = \bar{v}\sqrt{1-a^2}$, $\beta_\theta$ is the rate constant, $d_t$ is a thermal excitation process drawn from Gaussian distribution N(0,Q), τ is the discretization time step and $\bar{v}$ is the steady-state root-mean-square velocity.

The observation function $g(\ ) = [g_1(\ ), \ldots, g_\phi, \ldots, g_M(\ )]^T$ represents the relationship between the observation $Y_t = s^* = [s_1, \ldots, s_\phi, \ldots, s_M]^T$ and the state $X_t$. Let $[x_\phi, y_\phi]$ be line φ's center point, and let the intersection of the ellipse $X_t$ and the normal line φ be point $P_\phi$, the physical meaning of $s_\phi$ is the distance between $P_\phi$ and $[x_\phi, y_\phi]$. Further let angle $\theta_\phi$ be line φ's orientation, and let $x' = x_\phi - x_t^c$, $y' = y_\phi - y_t^c$, $\alpha = a_t$, and $\beta = a_t / \frac{1}{2}$. The between $s_\phi$ and $X_t$ can now be defined as:

$$s_\phi = g_\phi(X_t, v_t) \quad (12)$$

$$= v_t + \frac{-\left[\frac{x'\cos\theta_\phi}{\alpha^2} + \frac{y'\sin\theta_\phi}{\beta^2}\right]}{\left[\frac{\cos^2\theta_\phi}{\alpha^2} + \frac{\sin^2\theta_\phi}{\beta^2}\right]} + \frac{\sqrt{\left[\frac{x'\cos\theta_\phi}{\alpha^2} + \frac{y'\sin\theta_\phi}{\beta^2}\right]^2 - \left[\frac{\cos^2\theta_\phi}{\alpha^2} + \frac{\sin^2\theta_\phi}{\beta^2}\right]\left[\frac{x'^2}{\alpha^2} + \frac{y'^2}{\beta^2} - 1\right]}}{\left[\frac{\cos^2\theta_\phi}{\alpha^2} + \frac{\sin^2\theta_\phi}{\beta^2}\right]}$$

Because the $g(\ )$ is nonlinear, unscented transformation is used to estimate $K_t$, $X_{t|t-1}$ and $Y_{t|t-1}$ (see [2]).

A Gaussian distributed proposal function can then be formed based on the contour tracker as:

$$q_1(X_t^1 | X_{t-1}^1, Z_t^1) = N(\hat{X}_t^1, \hat{\Sigma}_t^1) \quad (13)$$

where $$\hat{\Sigma}_t^1$$

is the Kalman filter's covariance matrix.

4.2 The Color Tracker

Object interior region properties complement its contour in tracking. Color based tracking has been widely used in the literature. The Meanshift technique [3] is adopted in the present tracking system and process as the color tracker. This technique assumes that the color histogram of the target object $h_{obj}$ is stable and a recursive gradient decent searching scheme is used to find the region that is most similar to $h_{obj}$.

Figure 5A:
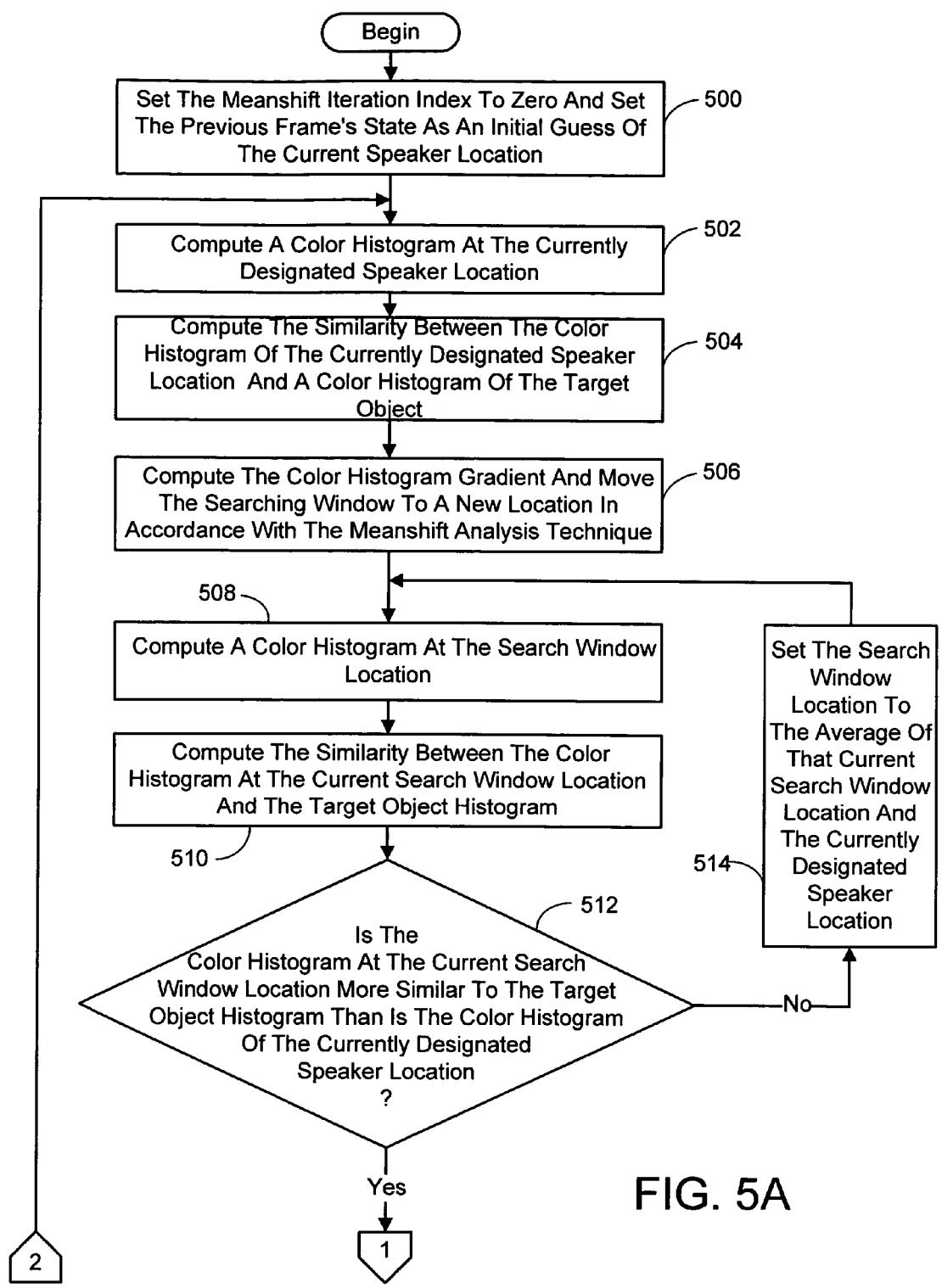
FIGS. 5A and 5B are a flow chart diagramming a process for color based tracking employing the Meanshift technique.
Figure 5B:
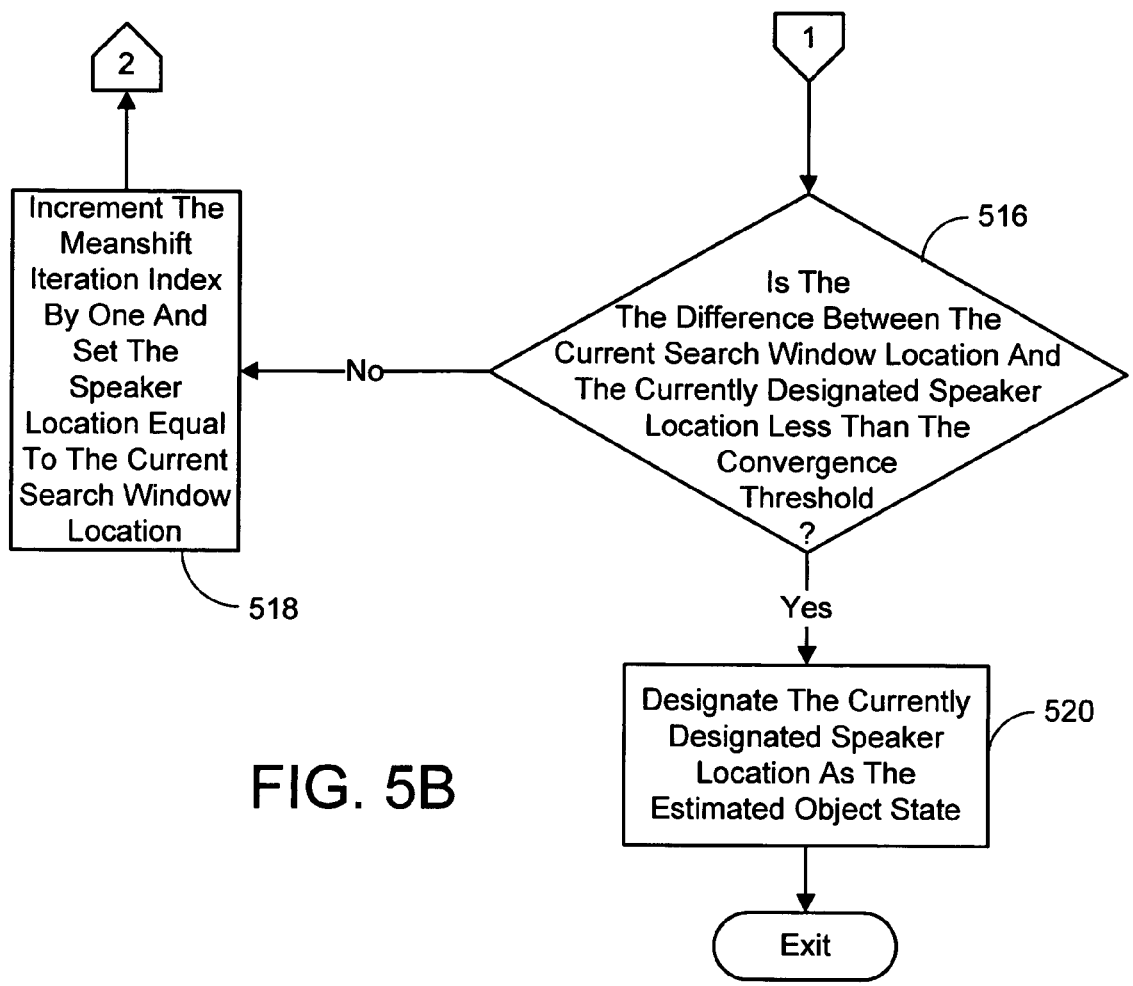

To track the object in the current frame, the following procedure is used to find the new object state $X_t^2$. Referring to FIGS. 5A and 5B, the procedure is initialized in process action 500 by setting the Meanshift iteration index l to zero and setting the previous frame's state $X_{t-1}^2$ as an initial guess of the current object state $\hat{X}_l$ (i.e. speaker location), such that $\hat{X}_0 = X_{t-1}^2$, where the superscript "2" in $X_{t-1}^2$ means this is the second tracker, i.e., k=2. The color histogram at $\hat{X}_l$ (i.e., $h_{\hat{X}_l}$) is then computed (process action 502). Next, the similarity between $h_{\hat{X}_l}$ and the color histogram of the target object (e.g., the speaker's head) is computed using the Bhattacharyya coefficient $\rho[h_{obj}, h_{\hat{X}_l}]$ [3] (process action 504). The color histogram gradient is then computed and the searching window is moved to the new location $\hat{X}_N$ in accordance with the Meanshift analysis technique [3] (process action 506). The color histogram at $\hat{X}_N$ (i.e., $h_{\hat{X}_N}$) is computed in process action 508, and the similarity between $h_{\hat{X}_N}$ and the target object histogram is also computed using the Bhattacharyya coefficient $\rho[h_{obj}, h_{\hat{X}_N}]$ (process action 510). It is then determined in process action 512 whether $\rho[h_{obj}, h_{\hat{X}_N}] > \rho[h_{obj}, h_{\hat{X}_l}]$. If not, then in process action 514, the current search window location $\hat{X}_N$ is set to the average of that location and location under consideration $\hat{X}_l$ (i.e., $\hat{X}_N = (\hat{X}_l + \hat{X}_N)/2$, and actions 508 through 514 are repeated as appropriate. If however, it is determined that $\rho[h_{obj}, h_{\hat{X}_N}] > \rho[h_{obj}, h_{\hat{X}_l}]$, then it is first determined if the difference between the current search window location and the location under consideration is less than a prescribed convergence threshold $\epsilon$, i.e., $\|\hat{X}_N - \hat{X}_l\| < \epsilon$ (process action 516). If not, then in process action 518, the Meanshift iteration index is incremented by one and the new location under consideration is set equal to the current search window location (i.e., $\hat{X}_l = \hat{X}_N$). Process actions 502 through 518 are then repeated as appropriate. If however, it is found that difference between the current search window location and the location under consideration is not less than the prescribed convergence threshold, then in the process action 520, the location under consideration $\hat{X}_l$ is designated as the estimated object state $\hat{X}_t^2$.

The foregoing procedure allows a Gaussian distributed proposal function to be formed based on the color tracker:

$$q_2(X_t^2 \mid X_{t-1}^2, Z_t^2) = N(\hat{X}_t^2, \hat{\Sigma}_t^2) \tag{14}$$

where $$\hat{\Sigma}_t^2$$

represents the uncertainty of the Meanshift color tracker technique.

4.3 The SSL Tracker

Vision-based trackers can only provide locations of people. It is audio-based trackers that can identify which particular person is speaking. But audio-based trackers have their own limitations. For example, it is quite difficult for them to estimate all the aforementioned elements of the object state.

Fortunately, in the context of a meetings and lectures to which the present speaker location system will typically be applied, the system cares the most about the horizontal location of the speaker $x_t^c$. This simplifies the SSL tracker design considerably as all that is needed is to have two microphones to estimate $x_t^c$.

More particularly, let s(t) be the speaker's source signal, and $x_1(t)$ and $x_2(t)$ be the signals received by the two microphones. Accordingly:

$$x_1(t) = s(t-D) + h_1(t)*s(t) + n_1(t)$$

$$x_2(t) = s(t) + h_2(t)*s(t) + n_2(t) \tag{15}$$

where D is the time delay between the two microphones, $h_1(t)$ and $h_2(t)$ represent reverberation, and $n_1(t)$ and $n_2(t)$ are the additive noise. Assuming the signal and noise are uncorrelated, D can be estimated by finding the maximum cross correlation between $x_1(t)$ and $x_2(t)$:

$$D = \arg\max \hat{R}_{x_1 x_2}(\tau) \tag{16}$$

$$\hat{R}_{x_1 x_2}(\tau) = \frac{1}{2\pi} \int_{\pi}^{-\pi} W(\omega) X_1(\omega) X_2^*(\omega) e^{j\omega\tau} d\omega$$

where $X_1(\omega)$ and $X_2(\omega)$ are the Fourier transforms of $x_1(t)$ and $x_2(t)$, $\hat{R}_{x_1 x_2}(\tau)$ is the cross correlation of $x_1(t)$ and $x_2(t)$, and W(w) is a frequency weighting function [13].

Figure 6:
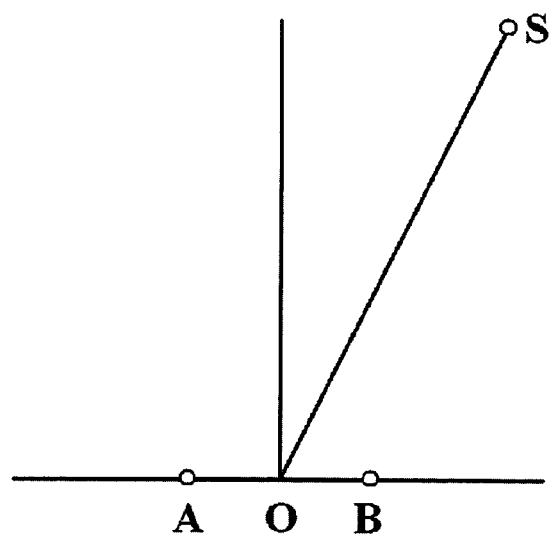
FIG. 6 is a diagram illustrating a microphone array's geometry having two microphones at positions A and B, and the middle point at position O. In addition, the sound source is at location S.

Once the time delay D is estimated from the above procedure, the horizontal sound source direction $x_t^c$ can be easily estimated given the microphone array's geometry. More particularly, let the two microphones be at positions A and B, and the middle point between them be position O. In addition, let the source be at location S, as illustrated in FIG. 6.

The goal of SSL is to estimate the angle $\angle SOB$. This can be accomplished as follows. Assuming the distance of the source $|OS|$ is much larger than the length of the baseline $|AB|$, then the angle $\angle SOB$ can be estimated as [13]:

$$\angle SOB = \arccos \frac{D \times v}{|AB|} \tag{17}$$

where v=342 m/s is the speed of sound traveling in air. Next, let the camera's optical center also be at location O, and convert $\angle SOB$ to object state $x^c$. If $\beta_F$ is the horizontal field of the view of the camera, and $x_R$ is the horizontal resolution of the camera in pixels, then $$\hat{X}_t^3 = \hat{x}_t^{c,3} = \frac{x_R/2}{\tan(\beta_F/2) \cdot \tan(\angle SOB)} \tag{18}$$

Thus, the audio-based SSL tracker is able to provide a third proposal function—namely $$q_3(X_t^3 \mid X_{t-1}^3, Z_t^3) = N(\hat{X}_t^3, \hat{\Sigma}_t^3),$$

where $$\Sigma_t^3$$

is the uncertainty of the SSL tracker and can be estimated from the cross correlation curve as described in [13].

5.0 Verifiers Used by the Fuser

In the previous section, three example trackers were developed based on the three sensors. Because it is desired that the trackers run in real time, simplified assumptions (e.g., Gaussianality, linearity and color constancy) are made. But as described in Section 3, a sensor can have both a tracker and a verifier. As the verifier only computes the likelihood of a given hypothesis, a more complex likelihood model can be used in the verifier, thus ensuring robust tracking. Three such verifiers corresponding to the previously described trackers are presented in the sub-sections to follow. Here again, these are just examples and other conventional verifier types could be employed.

5.1. The Contour Verifier

The contour tracker described in Section 4.1 only uses the local smoothness constraint (via HMM transition probability) when detecting contours. For the contour verifier, because each hypothesis generated by the fuser is already an ellipse, it implicitly enforces both the local smoothness constraint and the prior knowledge of the elliptic shape information. Thus, it is only necessary to check how well it matches the detected edge in current image frame.

To calculate the contour likelihood of a given hypothesis $X_t^{(i)}$, an edge detector is applied on the normal lines of the hypothesized contour as follows. Let $z_\phi$ denote the edge detection results on line $\phi$. By assuming the independence between different normal lines, the contour likelihood can be expressed as:

$$p(Z_t^1 \mid X_t^{(i)}) = \prod_{\phi=1}^{M} p(z_\phi \mid X_t^{(i)}) \quad (19)$$

where the superscript "1" used in $Z_t^1$ means this is the first of multiple verifiers. The term $p(z_\phi \mid X_t^{(i)})$ was previously defined in Eq. (9).

It is worth emphasizing again that the contour tracker only enforces a local contour smoothness constraint. It is therefore possible that the estimated contour can be stuck on a false target, e.g., a non-elliptic object. The contour verifier, on the other hand, is much stricter and enforces the prior knowledge of the elliptic shape information. The hypothesized contour points on all normal lines therefore need to have strong edges in order to get a high likelihood score. A non-elliptic object cannot get high likelihood score because it will never match well to any elliptic hypothesis.

5.2 The Color Verifier: A Discriminant Model

In the color-based tracker, to achieve fast and inexpensive tracking, it was assumed that an object's color histogram is stable and remains constant. In reality, however, the color histogram of an object changes because of lighting, shading and object motion. To handle this non-stationary nature, in the verifier the object color is allowed to change but is required to be sufficiently different from its nearby background color. That is, a discriminant model is used in the color verifier.

More particularly, for a given hypothesis $X_t^{(i)}$, let the object color histogram be $$h^f_{X_t^{(i)}}$$

and the neighboring background color histogram be $$h^b_{X_t^{(i)}}.$$

The similarity between the two histograms can be calculated using the Bhattacharyya coefficients [3] as:

$$\rho\left(h^f_{X_t^{(i)}}, h^b_{X_t^{(i)}}\right) = \sum_{l=0}^{l<Bin} \sqrt{h^f_{X_t^{(i)}}(l) \cdot h^b_{X_t^{(i)}}(l)} \quad (20)$$

where l is the index of the histogram bins. Because a discriminant model is used, the degree of difference between $$h^f_{X_t^{(i)}} \text{ and } h^b_{X_t^{(i)}}$$

furnishes the likelihood of the object. The likelihood for hypothesis $X_t^{(i)}$ is therefore:

$$P(Z_t^2 \mid X_t^{(i)}) = 1 - \rho\left(h^f_{X_t^{(i)}}, h^b_{X_t^{(i)}}\right) \quad (21)$$

5.3 The SSL Verifier

In a realistic room environment, there is both ambient noise (e.g., computer fans) and room reverberation. These factors cause the cross correlation curve $\hat{R}_{x_1 x_2}(\tau)$ to have multiple peaks. To achieve fast tracking speed, a premature 0/1 decision was made in the SSL tracker (see Section 4.3). When estimating $x_1^c$ (see Eq. (17) and (18)), only the time delay D was retained and the whole correlation curve was ignored. For the SSL verifier, it is possible to use a more accurate likelihood model by keeping the whole correlation curve $\hat{R}_{x_1 x_2}(\tau)$.

Thus, given a hypothesis $x_t^{c,(i)}$, its likelihood is defined as the ratio between its own height and the highest peak in the correlation curve $\hat{R}_{x_1 x_2}(\tau)$ [12] as follows:

$$p(Z_t^3 \mid x_c^{(i)}) = \hat{R}_{x_1 x_2}(D^{(i)}) / \hat{R}_{x_1 x_2}(D) \quad (22)$$

-continued $$\hat{R}_{x_1 x_2}(D^{(i)}) = \frac{|AB|}{v} \cos\left(\arctan\left(\frac{x_R/2}{x_c^{(i)} \cdot \tan(\beta_F)}\right)\right) \quad (23)$$

where Eq. (23) is obtained by substituting Eq. (17) into Eq. (18).

5.4 The Combined Verifier

By assuming independence between contour, color and audio, the combined object likelihood model is given by:

$$p(Z_t|X_t^{(i)}) = p(Z_t^1|X_t^{(i)}) \cdot p(Z_t^2|X_t^{(i)}) \cdot p(Z_t^3|x_t^{c,(i)}) \quad (24)$$

which is used in Eq. (7) to compute the particle weights.

6. Tracker Evaluation and Adaptation

In a non-stationary environment, object appearance can change and the background clutter (both vision and audio) can further complicate tracking. For example, when a person is turning his or her head, the color can change and this can cause the color-based tracker to fail. Online tracker evaluation and adaptation is therefore desirable, as more weight can be given to proposals generated by more reliable trackers. To this end, the unreliable trackers can be updated or re-initialized.

In the previously described framework, the current particle set $(X_t^{(i)}, w_t^{(i)})$ represents the estimated posterior distribution of the object state. It is possible to estimate the reliability of each of the individual trackers by comparing how similar/dissimilar their proposal functions $q_k(X_t^k|X_{0:t-1}^k, Z_t^k)$ are to the estimated posterior:

$$\lambda_k = \sum_{X_t^{(i)}} \sqrt{w_t^{(i)} \cdot q_k(X_t^{(i)} | X_{0:t-1}, Z_t^k)} \quad (25)$$

This performance evaluation formula is similar to the Bhattacharyya coefficient calculation except it is based on weighted particles. The intuition behind this formula is simple: if an individual proposal function significantly overlaps with the estimated posterior, it is a good proposal function and the corresponding tracker can be trusted more.

The fused tracking results can further be used to probabilistically adapt the individual trackers using:

$$X_t^k = \lambda_k \hat{X}_t^k + (1 - \lambda_k) \sum_{X_t^{(i)}} w_t^{(i)} \cdot X_t^{(i)} \quad (26)$$

where $\hat{X}_t^k$ (see Section 4) is tracker k's own estimate of $X_t$ and $$\sum w_t^{(i)} \cdot X_t^{(i)}$$

is the fuser's estimate of $X_t$. The reliability factor $\lambda_k$ plays the role of an automatic regulator. If an individual tracker is reliable, the current state for that tracker depends more on its own estimate; otherwise, it depends more on the fuser's estimate.

7.0 Application in Speaker Tracking

This section presents some examples on how this invention can be used in applications. Again, they are only examples. The invention can used in other applications.

A real-time speaker tracking module based on our proposed sensor fusion framework was designed and implemented. It was further integrated into a distributed meeting system similar to the one described in [4]. Our goal is to track the speaker's location so that the system can provide good views for remote participants. The tracked heads are marked by rectangles in FIGS. 7 and 8.

Figure 7:
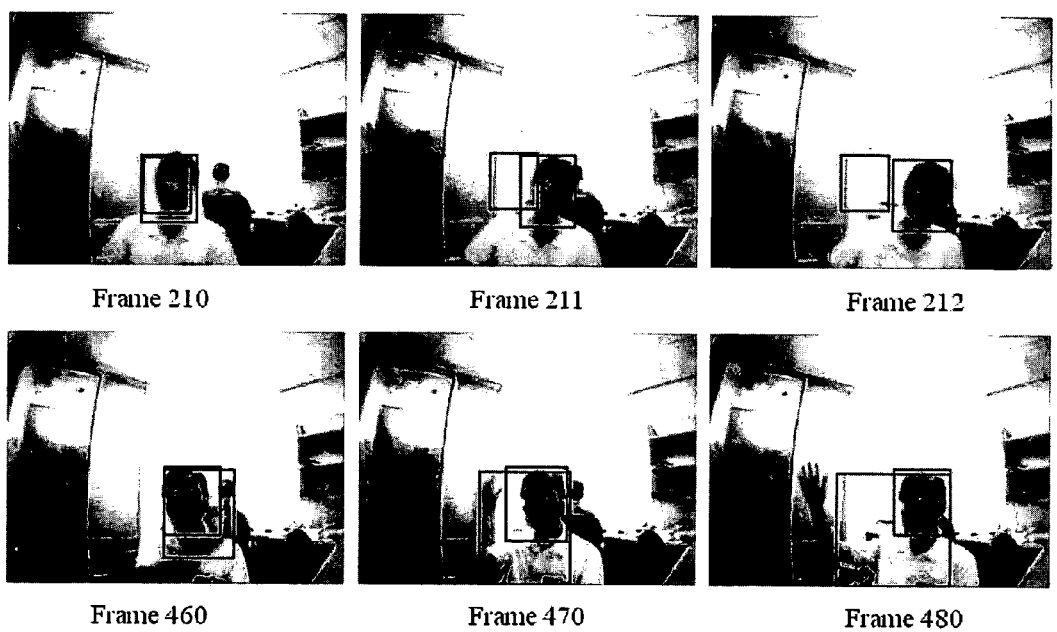
FIG. 7 is a series of images that illustrate a test of different tracker modules. In the first row, a contour tracker (smaller bounding box) loses track when the person suddenly moves but a color tracker (larger bounding box) survives. In the second row, the color tracker module (larger bounding box) fails when the person's arm waves, but the contour tracker (smaller bounding box) succeeds.

To test the robustness of the proposed algorithm, we use video sequences captured from both an office and a meeting room. The sequences simulate various tracking conditions, including appearance changes, quick movement, shape deformation, and noisy audio conditions. Sequence A, shown in FIG. 7, is a cluttered office environment with 700 frames (15 frames/sec). This sequence has difficult situations for both the contour tracker and the color tracker, and we only use these two vision-based trackers to demonstrate the fusion performance. On the first row in FIG. 7, the person suddenly moved his head at very fast speed. Because the contour tracker (smaller bounding box) restricts the contour detection to normal lines of predicted position, it loses track when the person suddenly changes his movement. But because the person's head appearance does change dramatically, the color tracker (larger bounding box) survives. On the second row, the waving hand, which has similar color to the face, greatly distracts the color tracker module. But the contour tracker succeeds by enforcing the object dynamics. The fused tracker successfully tracks the person throughout the sequence by combining the two individual trackers. To better illustrate the tracking results on small images, we did not plot the bounding box for the fused tracker. But it is similar to the better one of the two individual trackers at any given time t.

Figure 8:
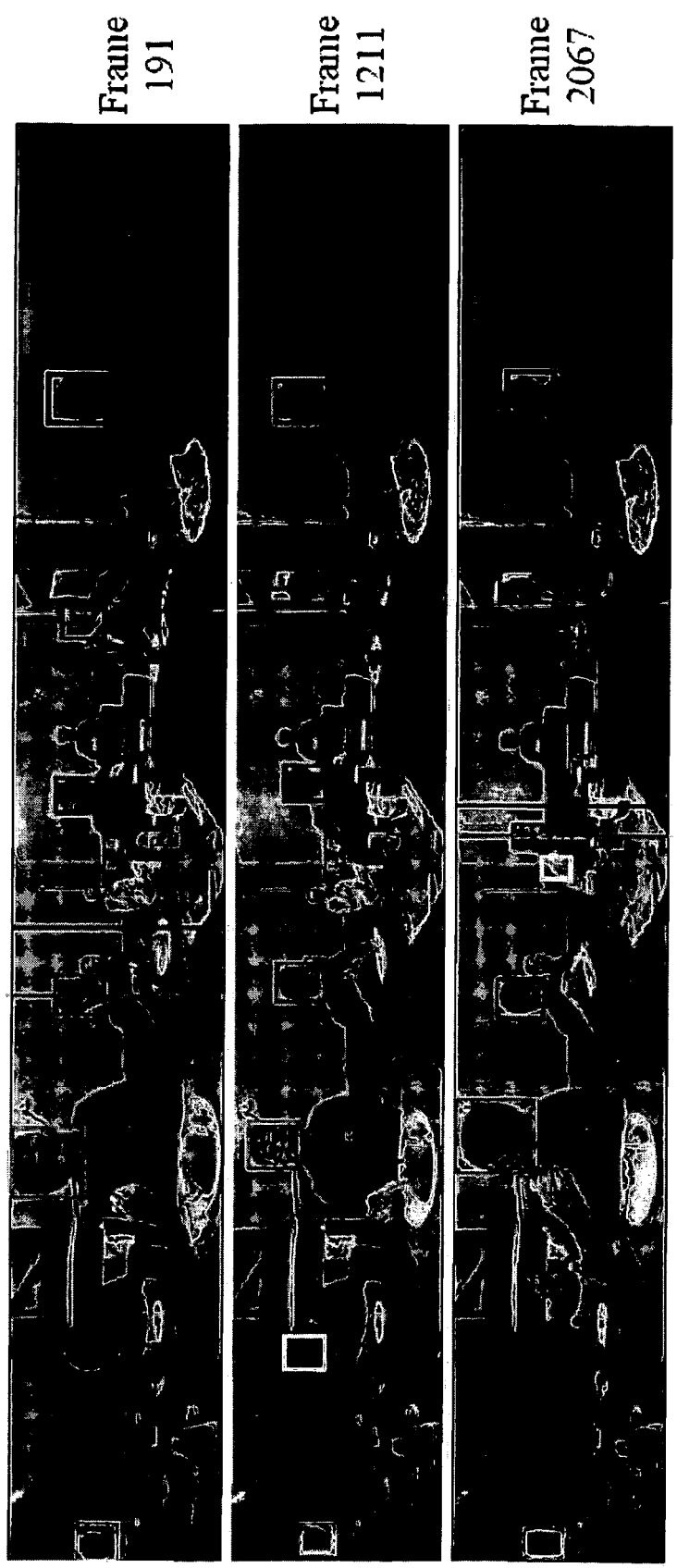
FIG. 8 is a series of panoramic images showing a 360 degree view of the whole meeting room that illustrate a test of different trackers and the sensor fusion technique according to the present invention. The bounding boxes are the fused tracking results from a contour tracker and color tracker. The darker vertical bar is the tracking results from SSL. The lighter vertical bar is the fused results based on all the three trackers.

Sequence B, shown in FIG. 8, is a one-hour long, real-life, group meeting. The meeting room has computer fan noise, TV monitor noise, and has walls/whiteboards that strongly reflect sound waves. The panorama video has a 360 degree view of the whole meeting room [4]. In this test sequence, we use three trackers—namely a contour tracker, a color tracker and a SSL tracker. The bounding boxes are the fused tracking results from the contour tracker and color tracker. The darker vertical bar is the tracking results from SSL. The lighter vertical bar is the fused results based on all the three trackers. The audio and vision based trackers complement each other in this speaker tracking task. Vision trackers have higher precision but are less robust while the audio tracker knows the active speaker but with less precision. The fused tracker is robust to both vision and audio background clutter.

8.0 References

[1] K. C. Chang, C. Y. Chong, and Y. Bar-Shalom. Joint probabilistic data association in distributed sensor networks. *IEEE Trans. on Automatic Control*, 31(10):889–897, 1986.

[2] Y. Chen, Y. Rui, and T. S. Huang. Parametric contour tracking using unscented Kalman filter. In *Proc. IEEE Int'l Conf. on Image Processing*, pages III: 613–616, 2002.

[3] D. Comaniciu, V. Ramesh, and P. Meer. Real-time tracking of non-rigid objects using mean shift. In *Proc. IEEE Int'l Conf. on Comput. Vis. and Patt. Recog.*, pages II 142–149, 2000.

[4] R. Cutler, Y. Rui, A. Gupta, J. Cadiz, I. Tashev, L. Wei He, A. Colburn, Z. Zhang, Z. Liu, and S. Silverberg.

Distributed meetings: A meeting capture and broadcasting system. In *Proc. ACM Conf. on Multimedia*, pages 123–132, 2002.

[5] A. Doucet. On sequencial simulation-based methods for Bayesian filtering. Technical Report CUED/F-INFENG/TR310, Cambridge University Engineering Department, 1998.

[6] M. Isard and A. Blake. Contour tracking by stochastic propagation of conditional density. In *Proc. European Conf. on Computer Vision*, pages 1:343–356,1996.

[7] M. Isard and A. Blake. ICONDENSATION: Unifying low-level and high-level tracking in a stochastic framework. In *Proc. European Conf. on Computer Vision*, pages 767–781,1998.

[8] J. S. Liu and R. Chen. Sequential Monte Carlo methods for dynamic systems. *Journal of the American Statistical Association*, 93(443):1032–1044, 1998.

[9] G. Loy, L. Fletcher, N. Apostoloff, and A. Zelinsky. An adaptive fusion architecture for target tracking. In *Proc. Int'l Conf. Automatic Face and Gesture Recognition*, pages 261–266, 2002.

[10] R. Merwe, A. Doucet, N. Freitas, and E. Wan. The unscented particle filter. Technical Report CUED/F-INFENG/TR 380, Cambridge University Engineering Department, 2000.

[11] L. R. Rabiner and B. H. Juang. An introduction to hidden Markov models. *IEEE Trans. Acoustic, Speech, and Signal Processing*, 3(1):4–15, January 1986.

[12] Y. Rui and Y. Chen. Better proposal distributions: Object tracking using unscented particle filter. In *Proc. IEEE Int'l Conf. on Comput. Vis. and Patt. Recog.*, pages 11:786–794,2001.

[13] Y. Rui and D. Florencio. Time delay estimation in the presence of correlated noise and reverberation. Technical Report MSR-TR-2003-01, Microsoft Research Redmond, 2003

[14] Y. Rui, L. He, A. Gupta, and Q. Liu. Building an intelligent camera management system. In *Proc. ACM Conf. on Multimedia*, pages 2–11, 2001.

[15] J. Sherrah and S. Gong. Continuous global evidence-based Bayesian modality fusion for simultaneous tracking of multiple objects. In *Proc. IEEE Int'l Conf. on Computer Vision*, pages 42–49, 2001.

[16] J. Vermaak and A. Blake. Nonlinear filtering for speaker tracking in noisy and reverberant environments. In *Proc. IEEE Int'l Conf. Acoustic Speech Signal Processing*, pages V:3021–3024, 2001.

[17] J. Vermaak, A. Blake, M. Gangnet, and P. Perez. Sequential Monte Carlo fusion of sound and vision for speaker tracking. In *Proc. IEEE Int'l Conf. on Computer Vision*, pages 741–746, 2001.

[18] Z. Zhang, L. Zhu, S. Li, and H. Zhang. Real-time multi-view face detection. In *Proc. Int'l Conf. Automatic Face and Gesture Recognition*, pages 149–154, 2002.

Wherefore, what is claimed is:

1. A computer-implemented process for tracking an object state over time using particle filter sensor fusion and a plurality of logical sensor modules, comprising for each iteration of the tracking process:

an inputting step for inputting an object state estimate from each logical sensor module as determined by an object state tracker of that sensor module, wherein the object state estimates are in the form of a Gaussian distribution;

a fusing step for combining the object state estimate distributions to form a proposal distribution;

a sampling step for sampling the proposal distribution to produce a series of particles which are provided to each of the logical sensor modules;

an estimating step preformed by an object state verifier of each logical sensor module for respectively estimating the likelihood of each provided particle;

a second inputting step for inputting the likelihood estimates from each logical sensor;

a computing step for computing a combined likelihood model for the particles from the likelihood estimates;

a second computing step for computing a weight for each particle from the combined likelihood model, the proposal distribution, an object dynamics model which models the changes in the object state over time, and the weight associated with a corresponding particle in the last tracking iteration; and a third computing step for computing a final estimate of the object state for the current tracking iteration using the particles and the particle weights, wherein said final object state estimate takes the form of a distribution.

2. The process of claim 1, wherein the fusing step comprises a weighting step for weighting each object state estimate distribution using a reliability factor associated with the object state tracker providing the distribution.

3. The process of claim 2, wherein the weighting step comprises a dynamic computing step for dynamically computing the reliability factor during each tracking iteration that quantifies the degree of similarity between the object state estimate distribution computed by a tracker and the final distribution computed for that iteration and an employing step for employing the last computed reliability factor in the next iteration.

4. The process of claim 1 further comprising a dynamic adapting step for dynamically adapting the object state tracker of each logical sensor module during each tracking iteration such that each tracker is provided with a revised object state estimate which is used in the next tracking iteration to compute an updated object state in lieu of using the object state computed by the tracker in the current tracking iteration.

5. A process for tracking an object state over time using particle filter sensor fusion and a plurality of logical sensors, comprising for each tracking iteration:

an inputting step for inputting an object state estimate from each logical sensor;

a combining step for combining the object state estimates to form a proposal distribution;

a sampling step for sampling the proposal distribution to produce a series of particles;

an estimating step performed by the logical sensors for estimating the likelihood of each particle;

second inputting step for inputting the likelihood estimates from each logical sensor;

a computing step for computing a weight for each particle based in part on the likelihood estimates input from each logical sensor; and a second computing step for computing a final estimate of the object state for the current tracking iteration using the particles and the particle weights.

6. The process of claim 5, wherein the second inputting step comprises a third computing step for computing a combined likelihood model for the particles from the likelihood estimates input from each logical sensor, and wherein the first computing step employs the combined likelihood model to compute the particle weights.

7. A process for tracking an object state over time using particle filter sensor fusion and a plurality of logical sensor modules, comprising:
- an inputting step for inputting an object state estimate from each logical sensor;
- a combining step for combining the object state estimates to form a proposal distribution;
- a sampling step for sampling the proposal distribution to produce a series of particles;
- an estimating step performed by the logical sensors for estimating the likelihood of each particle;
- a computing step for computing a weight for each particle based in part on the likelihood estimates from each logical sensor; and
- a second computing step for computing a final estimate of the object state for the current tracking iteration using the particles and the particle weights.

* * * * *